(12) United States Patent
Saruwatari et al.

(10) Patent No.: US 7,128,183 B2
(45) Date of Patent: Oct. 31, 2006

(54) ELECTRIC POWER STEERING APPARATUS

(75) Inventors: Takehiro Saruwatari, Kashiwara (JP);
Tetsuya Murakami, Nara (JP);
Kensaku Nakamura, Kashiba (JP);
Kousuke Yamanaka, Kashiwara (JP);
Masato Mizuhara, Takaishi (JP);
Atsuya Miyata, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 4 days.

(21) Appl. No.: 10/849,780

(22) Filed: May 21, 2004

(65) Prior Publication Data
US 2004/0238262 A1    Dec. 2, 2004

(30) Foreign Application Priority Data
May 28, 2003  (JP) .............................. 2003-151238

(51) Int. Cl.
*B62D 5/04*   (2006.01)
(52) U.S. Cl. ......................................... 180/444; 74/411
(58) Field of Classification Search ............... 180/444, 180/443; 74/388 PS, 89.23, 417, 443, 457, 74/459.5, 460, 46, 411 X, DIG. 10
See application file for complete search history.

(56) References Cited

U.S. PATENT DOCUMENTS

| | | | | |
|---|---|---|---|---|
| 4,898,040 A | * | 2/1990 | Tamba et al. .............. | 74/15.63 |
| 5,319,419 A | * | 6/1994 | Ishida et al. ................ | 399/208 |
| 6,354,395 B1 | * | 3/2002 | Cheng et al. ............... | 180/444 |
| 6,425,455 B1 | * | 7/2002 | Kurokawa et al. .......... | 180/444 |
| 2002/0148672 A1 | | 10/2002 | Tatewaki et al. | |

FOREIGN PATENT DOCUMENTS

| | | |
|---|---|---|
| JP | 55006064 | 1/1980 |
| JP | 59117951 | 7/1984 |
| JP | 7-232653 | 9/1995 |
| JP | 2002-308123 | 10/2002 |

OTHER PUBLICATIONS

W. Beitz, H-Kuttner: "Taschenbuch für den Maschinenbau", 1987, Springer-Verlag, Berlin, XP002363861 *p. G112-p. G114*.

* cited by examiner

*Primary Examiner*—Tony Winner
(74) *Attorney, Agent, or Firm*—Rabin & Berdo, P.C.

(57) ABSTRACT

An electric power steering apparatus comprises a speed reduction mechanism for decelerating the rotation of an output shaft in an electric motor for steering assist. The speed reduction mechanism comprises a driving gear connected to the output shaft in the electric motor and a driven gear meshed with the driving gear. One of respective tooth sections in the driving gear and the driven gear includes a tooth section formed of a material having a relatively low hardness, and the other tooth section includes a tooth section formed of a material having a relatively high hardness. The profile of the tooth section formed of the material having a relatively low hardness is shifted in the direction in which the thickness at the root of the teeth of the tooth section is increased. The profile of the tooth section formed of the material having a relatively high hardness is shifted in the direction in which the thickness at the root of the teeth of the tooth section is decreased.

20 Claims, 4 Drawing Sheets

ELECTRIC POWER STEERING APPARATUS

BACKGROUND OF THE INVENTION

1. Field of the Invention

The present invention relates to an electric power steering apparatus.

2. Description of Related Arts

There is provided one type of electric power steering apparatus for automobiles that amplifies an output of a motor for steering assist by a speed reduction mechanism comprising a pinion and a wheel meshed with the pinion.

What is proposed as this type of electric power steering apparatus has been an apparatus in which the whole or the surface of a tooth section of at least one of a pinion and a wheel is formed of synthetic resin in order to reduce vibration and noise caused by the mesh of the pinion and the wheel (see Japanese unexamined patent application 2002-308123, for example).

Furthermore, an electric power steering apparatus so adapted as to coat parts of the teeth of at least one of a pinion and a wheel with synthetic resin has been proposed (see Japanese unexamined patent application 07-232653 (1995), for example).

An example of electric power steering apparatuses is one of a so-called rack assist type in which an output of a motor is transmitted to a steering shaft (a rack shaft) through a motion conversion mechanism such as a ball screw mechanism in addition to the above-mentioned speed reduction mechanism.

In such an electric power steering apparatus of a rack assist type, it is important in reducing noise produced in a cabin of an automobile (a passenger compartment) to reduce noise produced by a speed reduction mechanism. Further, significantly high torque is inputted from a motor to the speed reduction mechanism. Therefore, the strength of the speed reduction mechanism must be sufficiently ensured.

When the whole of the tooth section is formed of synthetic resin, however, it may be impossible to sufficiently ensure the strength of the tooth section. On the other hand, when only the surface of the tooth section is formed of synthetic resin, it may be impossible to sufficiently absorb shock due to the mesh of both the pinion and the wheel and therefore, to sufficiently reduce noise.

The present invention has been made under such a background, and has an object to provide an electric power steering apparatus that can reduce noise and can ensure sufficient strength.

SUMMARY OF THE INVENTION

The present invention provides, in one mode, an electric power steering apparatus comprising an electric motor for producing a steering assist force, and a speed reduction mechanism for decelerating the rotation of an output shaft in the electric motor. The speed reduction mechanism comprises a driving gear connected to the output shaft in the electric motor and a driven gear meshed with the driving gear and surrounding a steering shaft. The driving gear and the driven gear respectively comprises tooth sections. One of the respective tooth sections in the driving gear and the driven gear includes the tooth section formed of a material having a relatively low hardness, and the other tooth section includes the tooth section formed of a material having a relatively high hardness. A profile of the tooth section formed of the material having the relatively low hardness is shifted in a direction in which a thickness at a root of the tooth section is increased, and a profile of the tooth section formed of the material having the relatively high hardness is shifted in a direction in which a thickness at a root of the tooth section is decreased.

In this mode, it is possible to reduce shock at the time of the mesh of both the gears by one of the gear having the tooth section formed of the material having a relatively low hardness and therefore, to significantly reduce noise produced by the speed reduction mechanism. Further, it is possible to sufficiently ensure the strength of one of the gears by increasing the thickness at the root of the tooth section formed of the material having a relatively low hardness and therefore, to sufficiently ensure the strength of the speed reduction mechanism.

DETAILED DESCRIPTION OF THE PREFERRED EMBODIMENT

A preferred embodiment of the present invention will be described while referring to the attached drawings.

Figure 1:
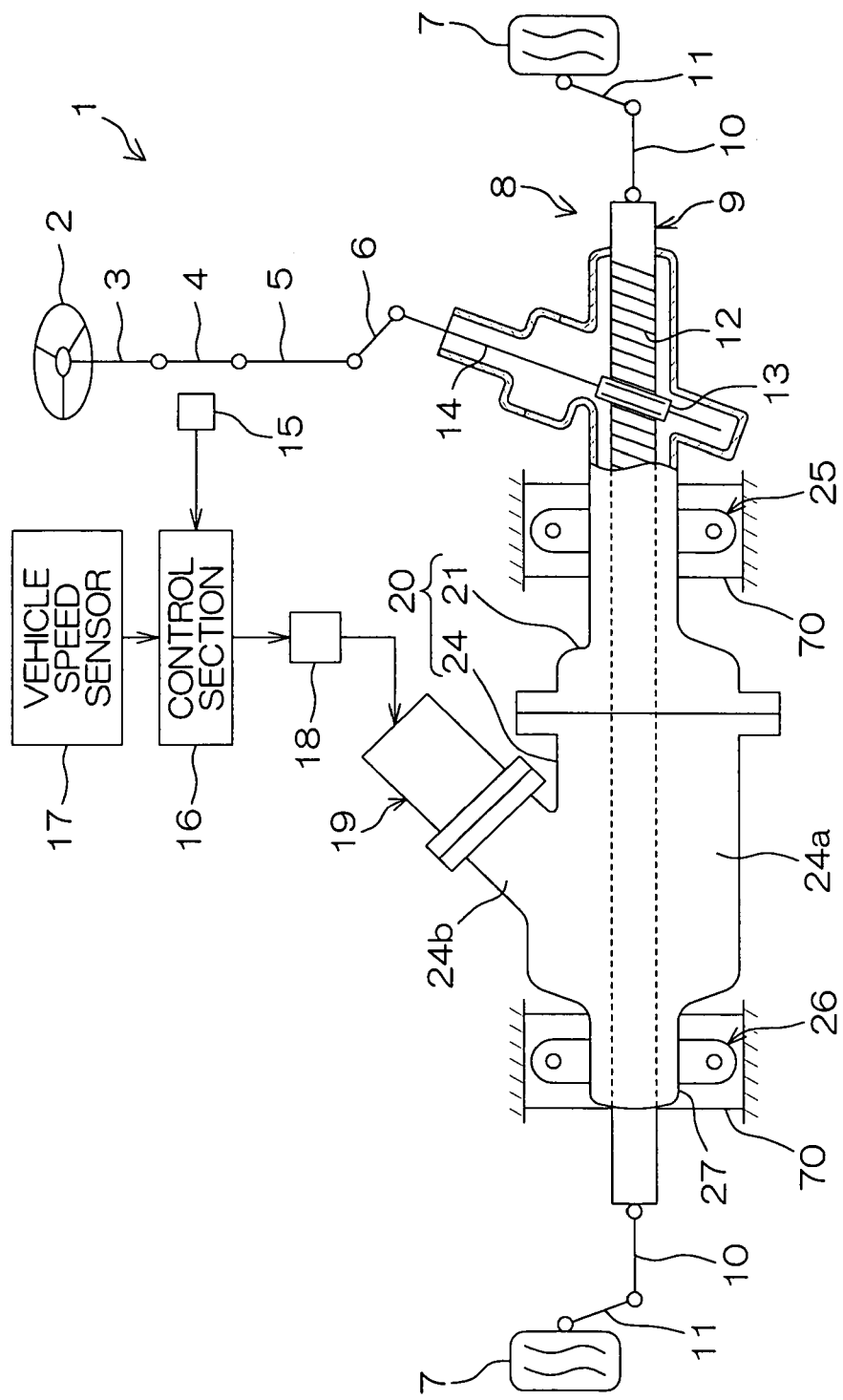
FIG. 1 is a schematic view showing the schematic configuration of an electric power steering apparatus according to an embodiment of the present invention.

FIG. 1 is a schematic view showing the schematic configuration of an electric power steering apparatus 1 according to an embodiment of the present invention. Referring to FIG. 1, the electric power steering apparatus 1 comprises a first steering shaft 3 connected to a steering member 2 such as a steering wheel, a second steering shaft 5 coaxially connected to the first steering shaft 3 through a torsion bar 4, and a steering mechanism 8 connecting with the second steering shaft 5 through an intermediate shaft 6 and composed of a rack-and-pinion mechanism or the like for achieving the rolling steering of a wheel 7.

The steering mechanism 8 comprises a third steering shaft 9 arranged so as to extend in the rightward and leftward direction of a vehicle and movable in the axial direction, and a knuckle arm 11 coupled to both ends of the third steering shaft 9 through a tie rod 10 and supporting the wheel 7.

The knuckle arm 11 is rotated to achieve the rolling steering of the wheel 7 by the axial movement of the third steering shaft 9. A rack 12 is formed in a part at one end of the third steering shaft 9. A pinion 13 is meshed with the rack 12, and is rotated as a pinion shaft 14 connected to the intermediate shaft 6 is rotated. When the first and second steering shafts 3 and 5 are rotated in response to the operation of the steering member 2, the rotation is converted into the axial movement of the third steering shaft 9 by the pinion 13 and the rack 12.

There is provided a torque sensor 15 for sensing steering torque generated by the steering member 2 by an amount of relative rotational displacement between the first and second steering shafts 3 and 5 through the torsion bar 4. A signal from the torque sensor 15 is inputted to a control section 16 comprising a microprocessor or the like. Further, a vehicle speed sensing signal from a vehicle speed sensor 17 is inputted to the control section 16.

The control section 16 outputs a control signal to a driving circuit 18 in response to the signals from the torque sensor 15 and the vehicle speed sensor 17. The driving circuit 18 to which the control signal has been fed supplies power to an electric motor 19 for steering assist, to drive the electric motor 19.

Figure 2:
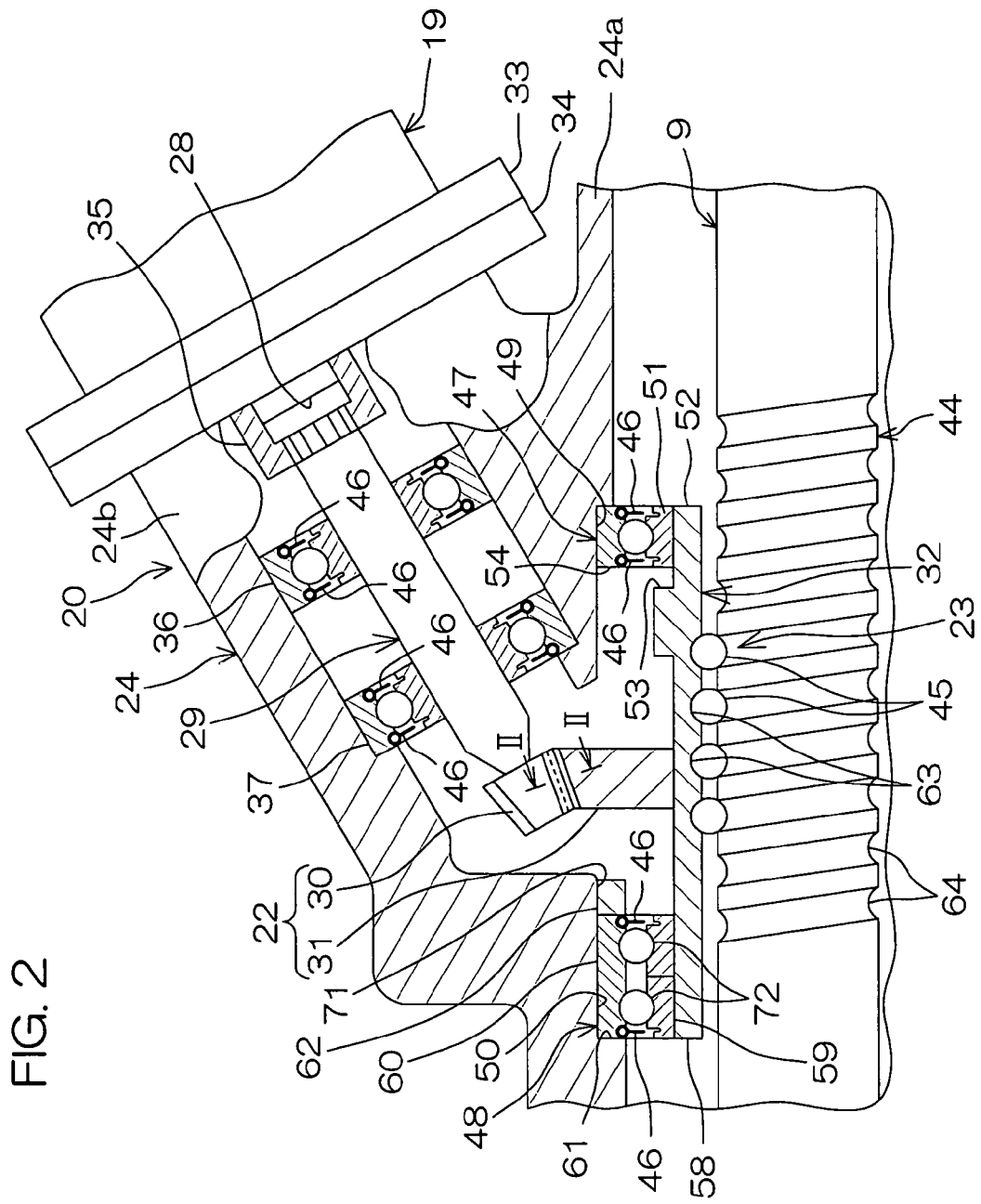
FIG. 2 is a cross-sectional view showing a principal part of the electric power steering apparatus.

FIG. 2 is a partially sectional view showing the vicinity of the electric motor 19. Referring to FIGS. 1 and 2, the third steering shaft 9 is accommodated in a housing 20. The housing 20 comprises a first section 21 serving as a rack housing mainly accommodating the third steering shaft 9 including the rack 12 and the pinion 13, and a second section 24 serving as a speed reduction gear housing mainly accommodating a speed reduction mechanism 22 and a ball screw mechanism 23 serving as a motion conversion mechanism. The second section 24 comprises a first cylindrical portion 24a surrounding the third steering shaft 9 and a second cylindrical portion 24b crossing the first cylindrical portion 24a in a crossing shape.

By separately forming the first section 21 and the second section 24 in the housing 20 from each other, each of components constituting the housing 20 can be made to be compact. The components can be easily assembled in the housing 20. Further, the dimensional precision of the housing 20 can be further improved by making formation and processing of the housing 20 easy.

The housing 20 is attached to a vehicle body 70 through first and second mount members 25 and 26, for example. The first mount member 25 is attached to an intermediate portion in the longitudinal direction, for example, of the first section 21 in the housing 20. The second mount member 26 is attached to an end 27, close to a wheel 7, for example, of the second section 24 in the housing 20.

The first and second mount members 25 and 26 are arranged with the second section 24 in the housing 20 for supporting the speed reduction mechanism 22 and the ball screw mechanism 23 interposed substantially from both sides. Consequently, the supporting rigidity of the second section 24 in the housing 20 by the mount members 25 and 26 can be made higher and therefore, the supporting rigidity of the speed reduction mechanism 22 and the ball screw mechanism 23 can be made high. The second mount member 26 may be arranged in an intermediate portion in the longitudinal direction of the second section 24.

Referring to FIG. 2, the speed reduction mechanism 22 comprises a driving gear 30 connected to an output shaft 28 in the electric motor 19 through a connecting shaft 29, and a driven gear 31 meshed with the driving gear 30 and surrounding the third steering shaft 9. The driving gear 30 has a relatively small diameter, and the driven gear 31 has a relatively large diameter. The speed reduction mechanism 22 includes a bevel gear mechanism, and the driving gear 30 and the driven gear 31 respectively include bevel gears meshed with each other.

The ball screw mechanism 23 serving as a motion conversion mechanism comprises a rotating cylinder 32 which is rotated integrally with the driven gear 31 in the speed reduction mechanism 22, to convert the rotation of the rotating cylinder 32 into the axial movement of the third steering shaft 9.

The rotation of the output shaft 28 in the electric motor 19 is transmitted to the rotating cylinder 32 in the ball screw mechanism 23 through the connecting shaft 29 and the speed reduction mechanism 22, and the rotation of the rotating cylinder 32 is converted into the axial movement of the third steering shaft 9, to feed a steering assist force to the third steering shaft 9.

A flange 33 of a motor housing in the electric motor 19 is fastened to a flange 34 formed in the outer periphery at an end of the second cylindrical portion 24b in the second section 24 in the housing 20 through a screw (not shown). One end of the connecting shaft 29 is connected to the output shaft 28 in the electric motor 19 through a joint 35 using a spline, for example, so as to be integrally rotatable.

The connecting shaft 29 is supported on the second cylindrical portion 24b in the second section 24 in the housing 20 so as to be rotatable through first and second bearings 36 and 37 spaced apart from each other in the axial direction of the connecting shaft 29. The driving gear 30 in the speed reduction mechanism 22 is connected to the other end of the connecting shaft 29 so as to be integrally rotatable.

Figure 3:
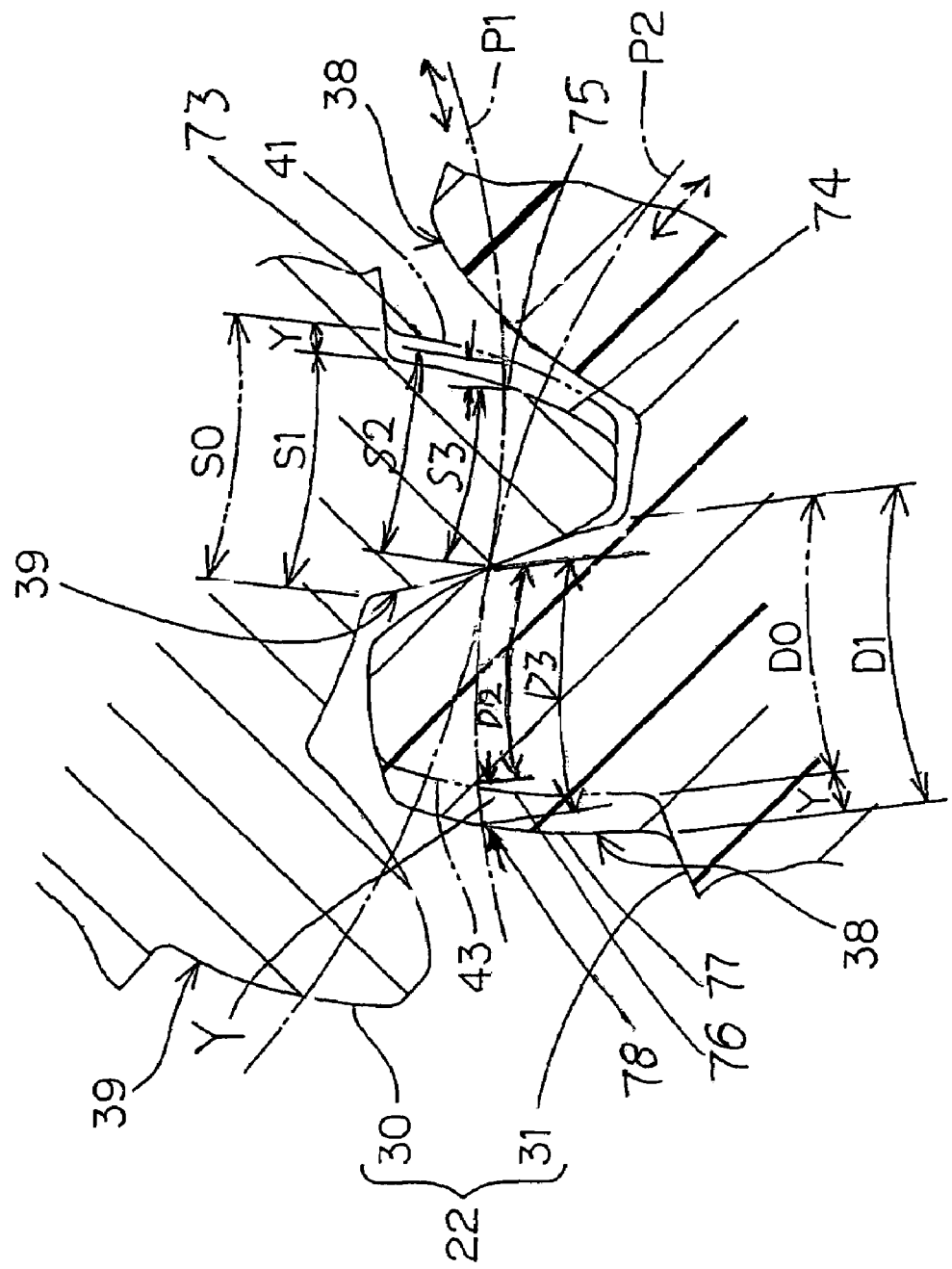
FIG. 3 is a cross-sectional view taken along a line II—II shown in FIG. 2.

FIG. 3 is a cross-sectional view taken along a line II—II shown in FIG. 2. Referring to FIG. 3, the present embodiment is characterized in that at least tooth sections 38 in the driven gear 31 in the speed reduction mechanism 22 are formed of a synthetic resin material serving as a material having a relatively low hardness, and at least tooth sections 39 in the driving gear 30 are formed of a metal material serving as a material having a relatively high hardness. More generally, either one of the respective tooth sections in the driving gear and the driven gear may be formed of a material having a relatively low hardness, and the other tooth section formed of a material having a relatively high hardness. The profile of each of the tooth sections 38 in the driven gear 31 is shifted in the direction in which the thickness at the root of the tooth section is increased, and the profile of each of the tooth sections 39 in the driving gear 30 is shifted in the direction in which the thickness at the root of the tooth section is decreased. That is, the respective tooth flanks of the tooth sections 38 and 39 are formed by so-called side shift. To form a tooth flank by side shift means that the tooth flank is formed by shifting the intersection of the tooth flank and a pitch line in the direction of the pitch line.

Specifically, at least each of the tooth section 39 in the driving gear 30, for example the whole of the driving gear 30, is formed of a metal material such as a carbon steel for machine structural use. As the carbon steel for machine structural use, S45C (JIS (Japanese Industrial Standard) G4051) can be exemplified.

In FIG. 3, the circular thickness S1 at the root of the tooth section 39 in the driving gear 30 is smaller by an amount of side shift Y along the circumference of its pitch circle P1 (corresponding to the direction of a pitch line) than the circular thickness S0 at the root of a tooth section 41 (a part of which is indicated by a two-dot and dash line in FIG. 3) in the driving gear in a case where the tooth section is not shifted sideward. Similarly, the circular thickness S3 along the circumference of the pitch circle P1 is also smaller by the same amount of side shift Y than the circular thickness S2 in the case where the tooth section is not shifted sideward. The flank 74 of the tooth section 39 is shifted by the amount of side shift Y relative to the reference flank 73, to intersect with the Ditch circle P1 at the position shown by reference numeral 75.

On the other hand, at least each of the tooth section 38 in the driven gear 31, for example the whole of the driven gear 31, is formed of a synthetic resin material such as polyamide resin or polyacetal resin. In FIG. 3, the circular thickness D1 at the root of the tooth section 38 in the driven gear 31 is larger by an amount of side shift Y along the circumference of its pitch circle P2 (corresponding to the direction of a pitch line) than the circular thickness D0 at the root of a tooth section 43 (a part of which is indicated by a two-dot and dash line in FIG. 3) in the driven gear in a case where the tooth section is not shifted sideward. The circular thickness D3 along the circumference of the pitch circle P2 is also larger by the same amount of side shift Y than the circular thickness D2 in the case where the tooth section is not shifted sideward. The flank 77 of the tooth section 38 is shifted by the amount of side shift Y relative to the reference flank 76, to intersect with the pitch circle P2 at the position shown by reference numeral 78.

As described in the foregoing, the tooth section 39 in the driving gear 30 and the tooth section 38 in the driven gear 31 are shifted sideward by amounts of side shift which correspond to each other, thereby making it possible to set backlash between the driving gear 30 and the driven gear 31, similarly to that between the driving gear and the driven gear which are not shifted sideward. Consequently, the position where the gears 30 and 31 are meshed with each other can be prevented from being shifted due to the side shift, thereby making it possible to prevent problems such as increase in mesh resistance from arising.

Referring to FIG. 2 again, the ball screw mechanism 23 comprises the rotating cylinder 32, described above, composed of a ball nut, a screw shaft 44 formed in a part of the third steering shaft 9 and not rotatable with respect to the housing 20, and a plurality of balls 45 serving as rolling members.

The driven gear 31 is fixed to an intermediate portion, for example, in the axial direction of the rotating cylinder 32 through a key (not shown) or the like. The rotating cylinder 32 is supported on the housing 20 so as to be rotatable while regulating the axial movement thereof through third and fourth bearings 47 and 48 each having a shielding plate 46 serving as a sealing member for sealing the inside of the bearing.

Figure 4:
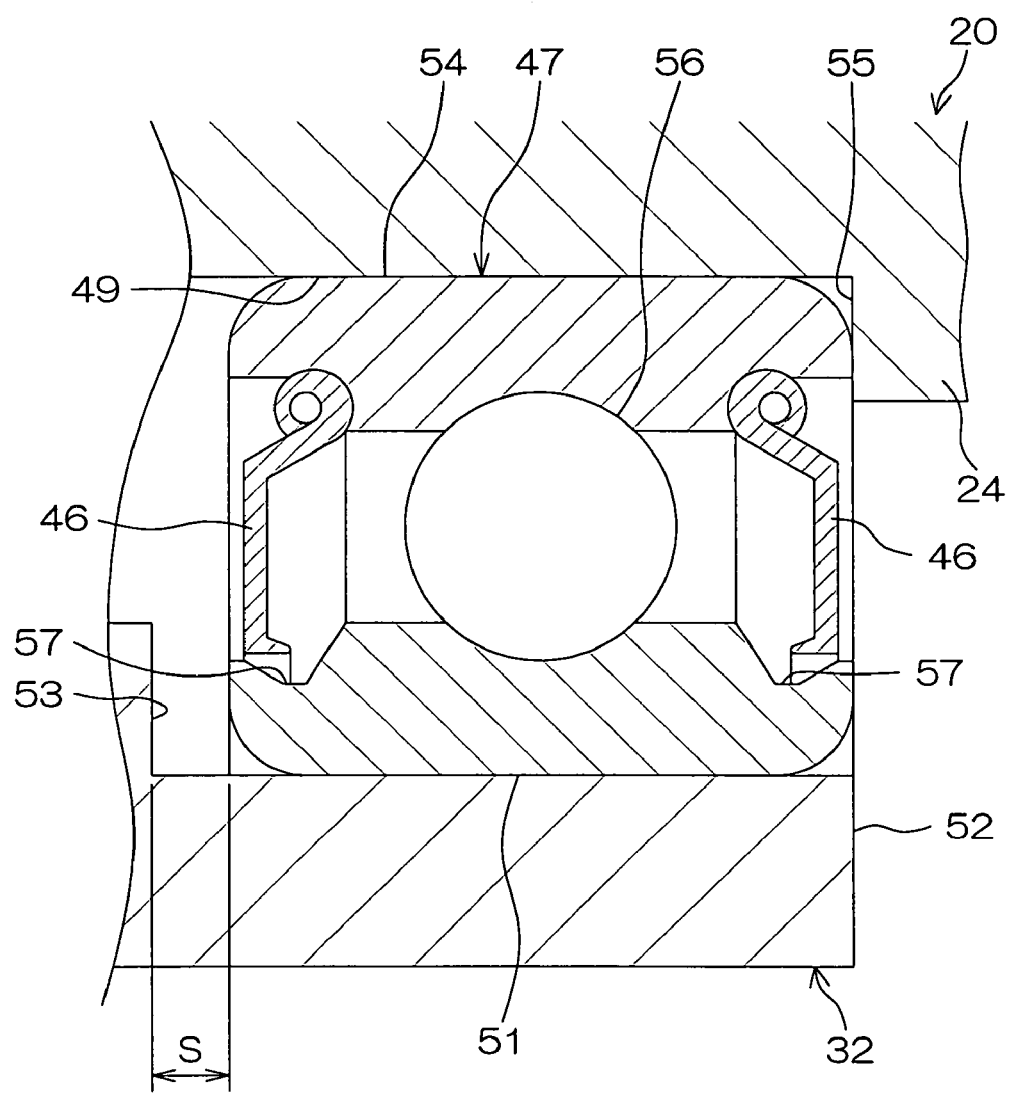
FIG. 4 is an enlarged view showing a part of FIG. 2.

FIG. 4 is an enlarged view showing the vicinity of the third bearing 47. Referring to FIGS. 2 and 4, the third bearing 47 is composed of a ball bearing, for example. The third bearing 47 is a so-called bearing with a rotational inner ring. The inner ring 51 is fitted in the outer periphery at an end 52 in the axial direction of the rotating cylinder 32. An annular step 53 is formed in the outer periphery near an intermediate portion in the axial direction of the rotating cylinder 32, and is opposed to the inner ring 51 in the third bearing 47 with predetermined spacing S (e.g., 0.8 mm) provided in the axial direction.

An outer ring 54 in the third bearing 47 is press-fitted in a bearing supporting hole 49 in the second section 24 in the housing 20, and is further abutted against an annular step 55 in the housing 20 to regulate the movement toward the other end of the third bearing 47 in the axial direction (rightward in FIG. 4).

Generally, the temperature inside an engine room where the housing 20 is arranged becomes significantly high (e.g., not less than 100° C.). Therefore, the housing 20 and the third bearing 47 thermally expand. Here, when materials for the housing 20 and the third bearing 47 differ from each other (e.g., when the housing 20 is made of aluminum, and the third bearing 47 is made of steel), the housing 20 expands greatly than the third bearing 47. Accordingly, the third bearing 47 may slip off the bearing supporting hole 49.

In the present embodiment, the rotating cylinder 32 is provided with the annular step 53, to regulate the movement toward one end of the third bearing 47 in the axial direction (leftward in FIG. 4) with respect to the housing 20 below the gap S, thereby preventing the third bearing 47 from slipping off the bearing supporting hole 49.

The shielding plate 46 has a Z shape in cross section, for example. A pair of shielding plates 46 is arranged with a rolling member 56 interposed therebetween in the axial direction. An outer peripheral edge of each of the shielding plates 46 is respectively attached to the outer ring 54. An annular groove 57 opposed to an inner peripheral edge of each-of the shielding plates 46 in a substantially radial direction is formed on an outer peripheral surface of the inner ring 51. Each of the shielding plates 46 extends inward in the radial direction from the outer ring 54 toward the corresponding annular groove 57. Consequently, each of the shielding plates 46 closes up an opening of a space where the rotating member 56 is arranged, thereby preventing foreign matter such as iron powder from entering the bearing.

Referring to FIG. 2, the above-mentioned first and second bearings 36 and 37 are constructed, similarly to the third bearing 47, thereby preventing foreign matter such as iron powder from entering the inside of the bearings.

The fourth bearing 48 is composed of, for example, a double row angular ball bearing, so called, with a rotational inner ring shape, and is attached to the other end 58 in the axial direction of the rotating cylinder 32. An inner ring 59 in the fourth bearing 48 is fitted in the outer periphery at the other end 58 in the axial direction of the rotating cylinder 32, and is fixed thereto by a screw member (not shown), for example.

An outer ring 60 in the fourth bearing 48 is fitted in a bearing supporting hole 50 in the second section 24 in the housing 20. The axial movement of the outer ring 60 with respect to the housing 20 is regulated with the outer ring 60 interposed between an annular step 61 in the second section 24 in the housing 20 and a screw member 62 screwed into a screw hole 71. The shielding plates 46 in the fourth bearing 48 are respectively attached to both ends in the axial direction of the outer ring 60, to close up an opening of a space where a rolling member 72 is arranged.

The rotating cylinder 32 has a screw groove 63 in its inner periphery, and concentrically surrounds the screw shaft 44. The balls 45 are interposed between the screw groove 63 in the inner periphery of the rotating cylinder 32 and a screw groove 64 formed in the outer periphery of the screw shaft 44. The rotating cylinder 32 and the screw shaft 44 are screwed into each other through the balls 45. The balls 45 are circulated in the screw grooves 63 and 64 by a configuration including a known mechanism (not shown). By the above-mentioned configuration, the third steering shaft 9 including the screw shaft 44 is moved in the axial direction as the rotating cylinder 32 is rotated.

As described in the foregoing, according to the present embodiment, it is possible to reduce shock at the time of the mesh of the driving gear 30 and the driven gear 31 by the driven gear 31 having the tooth section 38 formed of the synthetic resin material having a relatively low hardness and therefore, to significantly reduce noise produced by the speed reduction mechanism 22. Further, the strength of the driven gear 31 can be sufficiently ensured by increasing the circular thickness at the root of the tooth section 38 in the driven gear 31 formed of the material having a relatively low hardness by side shift and therefore, the strength of the speed reduction mechanism 22 can be sufficiently ensured. The driven gear 31 can be significantly lighter in weight by being formed of synthetic resin, as compared with the driven gear 31 formed of a metal, thereby making it possible to significantly reduce the rotational inertia of the driven gear 31 to make a steering feeling better.

Furthermore, by using the shielding plates 46, it is possible to prevent foreign matter from entering the first to fourth bearings 36, 37, 47, and 48 and to prevent an abnormal sound from the first to fourth bearings 36, 37, 47, and 48 from being produced to further reduce noise. Moreover, the driving gear 30 and the driven gear 31 can be arranged with the driving gear 30 inclined from the driven gear 31 by being respectively taken as bevel gears, thereby making it possible to make the degree of freedom in the arrangement of the speed reduction mechanism 22 higher.

In the present invention, only a part including the tooth section 38 in the driven gear 31 may be formed of a material having a relatively low hardness, and the other part may be formed of a material having a relatively high hardness, for example. Also, the tooth section 39 in the driving gear 30 may be formed of a material having a relatively low hardness, and the tooth section 38 in the driven gear 31 may be formed of a material having a relatively high hardness.

Furthermore, both the tooth section 38 in the driven gear 31 and the tooth section 39 in the driving gear 30 may be formed of a synthetic resin material. In this case, polyamide such as nylon, and polyacetal (POM: polyoxymethylene) can be exemplified as the material having a relatively low hardness, and PEEK (polyether ether ketone) and PPS (polyphenyl sulfide) can be exemplified as the material having a high hardness. In addition, both the tooth section 38 in the driven gear 31 and the tooth section 39 in the driving gear 30 may be formed of a metal material. In this case, an aluminum alloy can be used as the material having a relatively low hardness, and carbon steel can be used as the material having a high hardness.

In the first to fourth bearings 36, 37, 47, and 48, the shielding plate 46 may be replaced with a sealing plate having rubber fastened to its steel plate. Further, the ball screw mechanism 23 may be replaced with a bearing screw mechanism. Moreover, the speed reduction mechanism 22 may be replaced with a gear mechanism with parallel axes including a spur gear or the like.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

The present application corresponds to an application NO. 2003-151238 filed with the Japanese Patent Office on May 28, 2003, the disclosure of which is hereinto incorporated by reference.

What is claimed is:

1. An electric power steering apparatus, comprising:
    an electric motor for producing a steering assist force; and
    a speed reduction mechanism for decelerating the rotation of an output shaft in the electric motor, the speed reduction mechanism comprising
    a driving gear connected to the output shaft in the electric motor and
    a driven gear meshed with the driving gear,
    said driving gear and said driven gear comprising a first gear and a second gear;
    the first gear comprising a first tooth section and having a first pitch circle and the second gear respectively comprising a second tooth section and having a second pitch circle,
    the first tooth section formed of a material having a relatively low hardness, and the second tooth section formed of a material having a relatively high hardness,
    a flank of the first tooth section formed shifted an increment along a circumference of the first pitch circle such that a thickness of the first tooth section along the circumference of the first pitch circle is larger than a reference thickness of the first tooth section along the circumference of the first pitch circle in a case where the first tooth section is not shifted, and
    a flank of the second tooth section formed shifted a decrement along a circumference of the second pitch circle such that a thickness of the second tooth section along the circumference of the second pitch circle is smaller than a reference thickness along the circumference of the second pitch circle of the second tooth section in a case where the second tooth section is not shifted.

2. The electric power steering apparatus according to claim 1, wherein
    a motion conversion mechanism for converting rotation transmitted from the driven gear into an axial movement of a steering shaft,
    the motion conversion mechanism comprising a rotating cylinder which is rotated integrally with the driven gear,
    the driven gear including an annular gear surrounding the steering shaft.

3. The electric power steering apparatus according to claim 2, wherein
    the driving gear and the driven gear respectively include bevel gears meshed with each other.

4. The electric power steering apparatus according to claim 1, wherein
    the material having a relatively low hardness includes synthetic resin, and
    the material having a relatively high hardness includes a metal.

5. The electric power steering apparatus according to claim 4, wherein
    the synthetic resin includes polyamide resin.

6. The electric power steering apparatus according to claim 4, wherein
    the synthetic resin includes polyacetal resin.

7. The electric power steering apparatus according to claim 1, wherein
    the material having a relatively low hardness includes first synthetic resin, and
    the material having a relatively high hardness includes second synthetic resin.

8. The electric power steering apparatus according to claim 7, wherein
    the first synthetic resin includes polyamide resin.

9. The electric power steering apparatus according to claim 7, wherein
    the first synthetic resin includes polyacetal resin.

10. The electric power steering apparatus according to claim 7, wherein
    the second synthetic resin includes polyether ether ketone resin.

11. The electric power steering apparatus according to claim 7, wherein
    the second synthetic resin includes polyphenyl sulfide resin.

12. The electric power steering apparatus according to claim 1, wherein
    the material having a relatively low hardness includes an aluminum alloy, and
    the material having a relatively high hardness includes carbon steel.

13. The electric power steering apparatus according to claim 1, wherein
    a bearing for supporting the rotating cylinder so as to be rotatable, and a housing for holding the bearing, the bearing comprising an inner ring, an outer ring, and a sealing member for sealing a portion between the outer ring and the inner ring.

14. The electric power steering apparatus according to claim 1, wherein the motion conversion mechanism includes a ball screw mechanism.

15. The electric power steering apparatus according to claim 1, wherein the driving year includes a gear having a relatively small diameter, and the driven gear includes a gear having a relatively large diameter.

16. The electric power steering apparatus according to claim 1, wherein the increment along the circumference of the first pitch circle is substantially equal to the decrement along the circumference of the second pitch circle.

17. The electric power steering apparatus according to claim 1, wherein a flank of the first tooth section is formed shifted an increment at a root of the first tooth section such that a thickness at the root of the first tooth section is larger than a reference thickness at the root of the first tooth section in a case where the first tooth section is not shifted, and a flank of the second tooth section is formed shifted a decrement at a root of the second tooth section such that a thickness at the root of the second tooth section is smaller than a reference thickness at the root of the second tooth section in a case where the second tooth section is not shifted.

18. The electric power steering apparatus according to claim 17, wherein the increment at the root of the first tooth section is substantially equal to the decrement at the root of the second tooth section.

19. The electric power steering apparatus according to claim 17, wherein the increment at the root of the first tooth section is substantially equal to the increment along the circumference of the first pitch circle.

20. The electric power steering apparatus according to claim 17, wherein the decrement at the root of the second tooth section is substantially equal to the decrement along the circumference of the second pitch circle.

* * * * *